United States Patent
Denoual et al.

(10) Patent No.: US 8,368,022 B2
(45) Date of Patent: Feb. 5, 2013

(54) BOLOMETER WITH HEAT FEEDBACK

(75) Inventors: Matthieu Denoual, Caen (FR); Didier Robbes, Lantheuil (FR); Sébastien Delaunay, Amaye sur Orne (FR)

(73) Assignee: Centre National de la Recherche Scientifique (CNRS), Paris (FR)

( * ) Notice: Subject to any disclaimer, the term of this patent is extended or adjusted under 35 U.S.C. 154(b) by 295 days.

(21) Appl. No.: 12/677,325

(22) PCT Filed: Sep. 9, 2008

(86) PCT No.: PCT/EP2008/061899
§ 371 (c)(1),
(2), (4) Date: Jun. 24, 2010

(87) PCT Pub. No.: WO2009/034066
PCT Pub. Date: Mar. 19, 2009

(65) Prior Publication Data
US 2010/0288931 A1  Nov. 18, 2010

(30) Foreign Application Priority Data
Sep. 10, 2007  (FR) .................................. 07 06329

(51) Int. Cl.
*G01J 5/00* (2006.01)

(52) U.S. Cl. ............. 250/338.1; 250/336.1; 250/339.03; 250/338.3

(58) Field of Classification Search ............... 250/338.1, 250/336.1, 339.03, 338.3
See application file for complete search history.

(56) References Cited

U.S. PATENT DOCUMENTS 6,515,285 B1 * 2/2003 Marshall et al. ............. 250/352
2006/0266943 A1 * 11/2006 Phelan, Jr. ................. 250/338.3
2009/0014655 A1 * 1/2009 Seppa et al. ................. 250/340
2009/0121139 A1 * 5/2009 Chamming's ............... 250/340

(Continued)

FOREIGN PATENT DOCUMENTS
GB    2 207 501    2/1989
WO    WO 93/26050   12/1993

(Continued)

OTHER PUBLICATIONS

Rice, J. P. et al.; "The NIST EOS Thermal-Infrared Transfer Radiometer;" Metrologia, 35, 1998; pp. 505-509.

(Continued)

*Primary Examiner* — Christine Sung
(74) *Attorney, Agent, or Firm* — Harness, Dickey & Pierce, P.L.C.

(57) ABSTRACT

A bolometer comprising an outer surface for the thermal absorption of incident radiation in thermal contact with a radiation measurement element having a variable resistance (R) depending on the temperature, the element being in a heat feedback loop comprising a corrector for applying a heating power to a resistive heating means in order to maintain the temperature of the resistor equal to a setpoint temperature ($T_{ref}$). According to the invention, the resistive heating means comprises the element, the corrector is designed to generate a frequency component (S1) of the heating power, which is applied to a coupling means provided between the element and the corrector in order to apply a DC-free signal to the element, a coupling means, separate from the means, is provided between the element and a DC bias means in order to maintain the resistor at a prescribed continuous operation point.

13 Claims, 4 Drawing Sheets

U.S. PATENT DOCUMENTS

| | | | |
|---|---|---|---|
| 2009/0152465 A1* | 6/2009 | Dupont et al. | 250/338.1 |
| 2010/0001173 A1* | 1/2010 | Hanson et al. | 250/214 A |

FOREIGN PATENT DOCUMENTS

| | | |
|---|---|---|
| WO | WO 94/01743 | 1/1994 |
| WO | WO 02/04904 | 1/2002 |
| WO | WO 02/08707 | 1/2002 |
| WO | WO 2006/120290 | 11/2006 |

OTHER PUBLICATIONS

Richards, P. L.; "Bolometers for Infrared and Millimeter Waves;" J. Appl. Phys., vol. 76, No. 1, Jul. 1, 1994; pp. 1-24.

Reintsema, Carl D., et al.; "High Precision Electrical Substitution Radiometer Based on Superconducting-Resistive-Transition Edge Thermometry;" Rev. Sci. Instrum., XP-002484881, vol. 69, No. 1, Jan. 1998; pp. 152-189.

Allègre, G. et al.; "A Room Temperature $Si_3N_4/SiO_2$ Membrane-Type Electrical Substitution Radiometer Using Thin Film Platinum Thermometers;" Meas. Sci. Technol., 18, 2007; pp. 183-189.

Allègre, G. et al.; "A Room Temperature $Si_3N_4/SiO_2$ Membrane-Type Electrical Substitution Radiometer using Thin Film Platinum Thermometers;" Meas. Sci. Technol., 17, 2006; pp. 1-7 (uncorrected proof).

* cited by examiner

BOLOMETER WITH HEAT FEEDBACK

CROSS-REFERENCE TO RELATED APPLICATIONS

This application is a National Phase Entry of International Application No. PCT/EP2008/061899, filed Sep. 9, 2008, which claims priority to French Application No. 07 06329, filed Sep. 10, 2007, both of which are incorporated by reference herein.

BACKGROUND AND SUMMARY

The invention relates to a bolometer for measuring the intensity or the presence of incident radiation.

A field of application of the invention is radiation sensors, for example used in infrared imaging or in infrared thermography at room temperature.

A bolometer conventionally comprises a variable temperature-dependent resistance and a body absorbing the incident radiation or another external signal. By measuring the variation of this resistance, it is possible to measure this temperature, with which itself the variation of the incident external signal may be traced back.

This type of sensor may be applied to radiometry, the radiations then absorbed at the surface of the bolometer heat up the bolometer and in this case, the measurement of the temperature of the bolometer gives an indirect measurement of the received power.

The operating principle of bolometers is based on thermal phenomena which are essentially relatively slow, even if miniaturization is contemplated with which the time constants may be reduced.

The thermal properties of the system are related to the heat conductance between the measurement element and a thermostat, as well as to the heat capacity of the element subject to the radiation. These parameters define the response time of the system.

Improving the performances of bolometers is a key point for increasing the sensitivity and response times of the targeted applications. These improvements in performances may be obtained by closing the loop of the system by means of heat feedback.

The document "A room temperature $Si_3N_4/SiO_2$ membrane-type electrical substitution radiometer using thin film platinum thermometers", G. Allègre, B. Guillet, D. Robbes, L. Méchin, S. Lebargy, S. Nicoletti, Institute of Physics Publishing, Measurement Science and Technology, 17(2006) 1-7, describes the feedback control principle by electric substitution of heat. In the absence of incident light, the temperature of the membrane forming the absorbing receiver is maintained constant at a value $T_{ref}$ by using a resistive heating device and a temperature control device. In the presence of light, the power required for maintaining the membrane at temperature $T_{ref}$ is provided by the resistive heating device and the chopped incident light. The incident power on the absorbing receiver may be estimated by measuring the equivalent electric power required for obtaining the same rise in temperature by using either one of the two heating methods.

This known device with heat feedback has the drawback of a large occupied volume, which acts to the detriment of the integration and miniaturization of the system. This drawback is critical in the case of high integration applications such as for example matrices of pixels which may be used for forming night vision cameras. Another drawback is the delay between the deposition of heat and the temperature measurement, which limits the performances of the system in a closed loop (gain margin and phase margin).

The invention is directed to obtaining a bolometer overcoming the drawbacks of the state of the art, and to improving the performances of the feedback control.

For this purpose, a first object of the invention is a bolometer, including an outer surface for thermal absorption of incident radiation, the absorption surface being in thermal contact with at least one element for measuring the incident radiation, having an electric measurement resistor, which is variable with temperature, the measurement element being located in a heat feedback loop including a corrector for applying heating power to a heating resistive means in order to maintain the temperature of the electric measurement resistance equal to a setpoint temperature, characterized in that the resistive heating means comprises the measurement element, the corrector is provided for generating a frequency component of the heating power, which is applied to a first coupling means provided between the measurement element and the corrector in order to apply to the measurement element a DC-free signal, a second coupling means distinct from the first coupling means is provided between the measurement element and a DC biasing means for maintaining the electric measurement resistance at a prescribed DC operation point.

According to other features of the invention,

The resistive heating means is formed by the measurement element.

The first coupling means is capacitive.

The heat feedback loop and the DC biasing means are provided for modifying the power dissipated in the measurement resistor without changing its operation point.

The first coupling means applies to the measurement element a signal in a frequency band above 20 kHz.

The heat feedback loop includes a means for forming an error signal between the signal present in the measurement element and a corresponding signal with a prescribed constant setpoint, the corrector being provided for applying to the measurement element via the first coupling means an alternating signal depending on the error signal.

The corrector is provided for applying to the measurement element via the first coupling means an alternating signal which is amplitude-modulated by the error signal.

The corrector is provided for applying to the measurement element via the first coupling means, a first sinusoidal signal which is amplitude-modulated by the error signal.

The corrector includes a means for linearizing the frequency component of the heating power according to the error signal.

The linearization means of the corrector includes a means for pulse-width modulation of the error signal in order to form an intermediate signal and a means for modulating the intermediate signal with a second sinusoidal signal in order to form a first sinusoidal signal applied to the measurement element via at least the first coupling means.

The corrector includes an analog-digital conversion means for converting the analog error signal into a digital signal, the means for pulse-width modulation of the error signal includes a corrector of the proportional and integral type for the digital signal in order to form the intermediate signal.

The linearization means of the corrector includes a means for forming the square root of the error signal or of a signal proportional to the error signal in order to form an intermediate signal and a means for modulating the intermediate signal with a sinusoidal signal in order to form the alternating signal.

The means for forming the error signal is digital.

The measurement resistor for example consists of manganite.

BRIEF DESCRIPTION OF DRAWINGS

The invention will be better understood upon reading the description which follows, only given as a non-limiting example with reference to the appended drawings, wherein.

DETAILED DESCRIPTION

Figure 1:
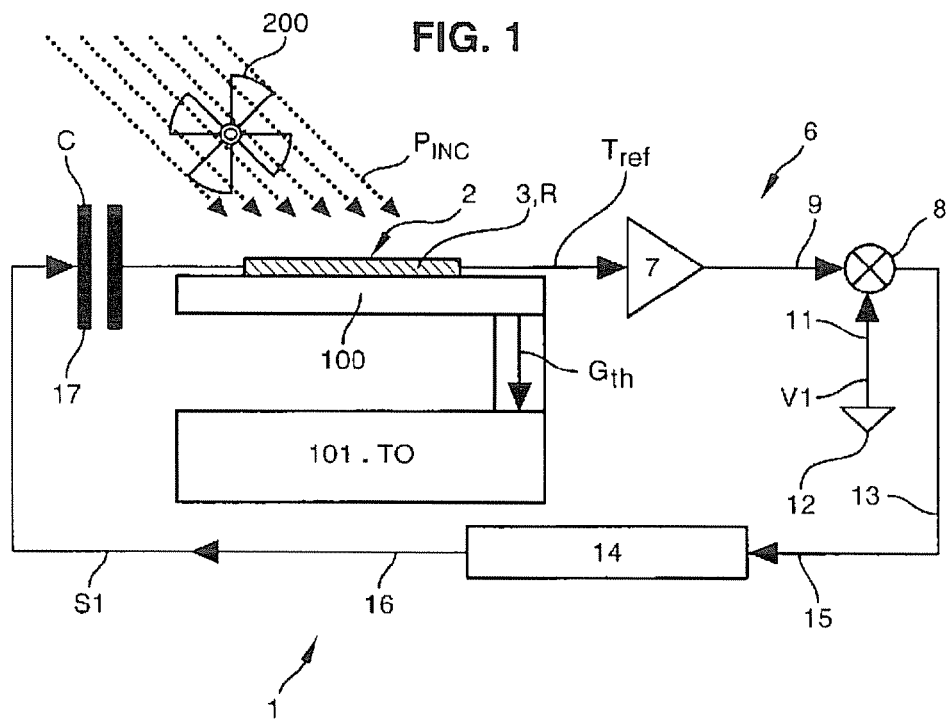
FIG. 1 is a diagram of the thermal principle of the bolometer according to the invention.

In the figures, the bolometer 1 includes a surface 2 in a material for absorbing incident radiation having a power $P_{INC}$ to be measured, which may for example be infrared radiation. The surface 2 is located on at least one measurement element 3 having a variable resistor R depending on temperature according to a known function, notably depending on the constitutive material of the element 3, as this is known to one skilled in the art. The resistor R may for example be in manganite or manganese oxides which have strong variations of resistance, in gold or in aluminium. The measurement element 3 is provided on a substrate 100 and has a determined heat conductance $G_{th}$ to a thermostat 101 maintained at a determined temperature T0. The incident radiation $P_{INC}$ is sent to the surface 2 towards the element 3 for example via a chopper device 200, as this is known. The incident radiated signal has an angular frequency Ω, the value of which has been determined beforehand. Of course, the incident radiation may not be chopped. The angular frequency Ω is related to the chopper device 200 if it is used and/or to the changes over time of the incident signal.

In the embodiment illustrated in the figures, the measurement element 3 is for example purely resistive.

Further, a single measurement element 3 is provided for example. Of course, a plurality of measurement elements 3 may be provided, like e.g. in the case of arrays of measurement elements.

According to the invention, the measurement resistor R is used both for measuring the temperature quantity and for feedback control of the heat quantity.

Figure 2:
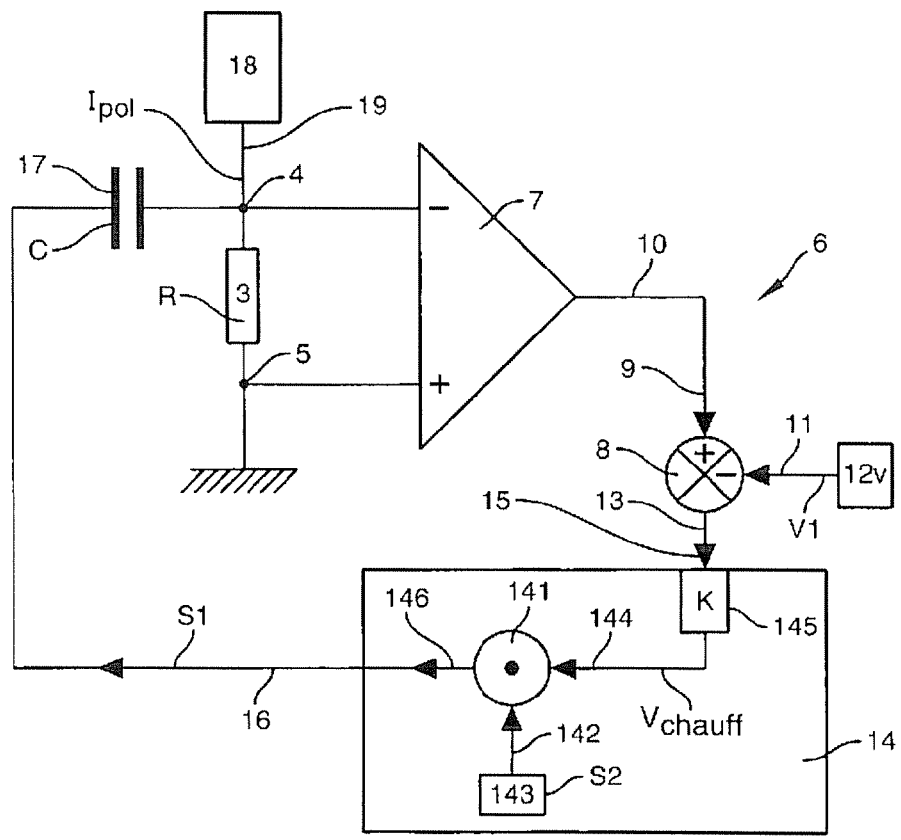
FIG. 2 is an electric diagram of the principle of the bolometer according to the invention, in a first embodiment.
Figure 3:
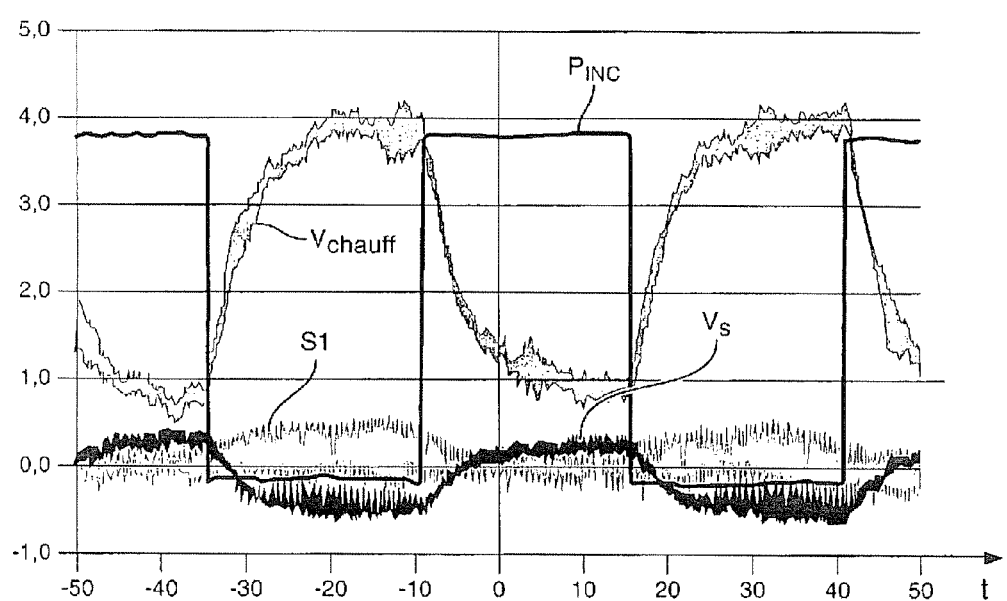
FIG. 3 illustrates time diagrams of signals measured on a bolometer according to the first embodiment.

In a first embodiment illustrated in FIGS. 1 to 3, the measurement element 3 is connected through its two first and second terminals 4, 5 to a heat feedback loop 6 in order to maintain the temperature of the measurement element 3 equal to a setpoint temperature $T_{ref}$. The loop 6 includes: a device 7 for amplifying the voltage on the terminals of the element 3, a subtracting element 8 including a first input 9 connected to the voltage output 10 of the amplifier device 7 and a second input 11 connected to a module 12 imposing a prescribed constant setpoint voltage V1, in order to form on an output 13 of the subtracting device 8, the difference $V_{chauff}$ or an error signal between both inputs 9, 11. The output 13 of the subtracting device 8 is connected to the input 15 of a corrector module 14 applying through its output 16 an alternating signal S1 depending on the signal present on its input 15. The output 16 is connected through a first coupling means 17 to the measurement element 3.

A module 18, distinct from the heat feedback loop 6, is provided for imposing prescribed biasing $I_{pol}$ of the DC current operating point of the measurement element 3 via a second coupling means 19, while the first coupling means 17 applies to the measurement element 3 a frequency component S1 with zero average. For example, in FIG. 2, the coupling means 17, 19 are connected to a same node formed by the first terminal 4 of the element 3, the second terminal 5 of which is connected to the ground.

The frequency signal S1 is used for heating the resistor R of the measurement element 3. Thus, the resistive heating element(s) of the loop 6 comprise(s) the measurement element 3.

The heat feedback by the heating signal S1 subordinates the temperature of the measurement resistance R to the temperature $T_{ref}$, without modifying its operating point related to the bias current $I_{pol}$ flowing through it.

In one embodiment, the resistive heating element(s) of the loop 6 only comprise(s) the measurement element 3.

In the embodiment illustrated in the figures, the first coupling means 17 is capacitive and comprises one or more capacitors forming a capacitance C with a determined value. The second coupling means 19 is formed by simple electric conductors.

The heating signal S1 is for example a high frequency signal in a frequency band above 20 kHz.

In one embodiment, the corrector 14 forms a first heating signal S1, which is sinusoidal and for example proportional to the signal on the input 15. The heating signal S1 is for example formed by amplitude-modulation of the difference signal $V_{chauff}$ by a second sinusoidal signal S2 having said frequency. The corrector 14 for example comprises for this purpose a multiplier 141 including a first input 142 connected to the module 143 for providing the second sinusoidal signal sin(ω.t), a second input 44 connected to the input 15, for example via a module 145 providing a prescribed constant multiplying factor K, and an output 146 connected to the output 16. The elements 141, 143 form a means for modulating the intermediate signal on the input 144 with the sinusoidal signal S2 in order to form the alternating signal S1.

For example one has:

$$S1 = V_{chauff} \cdot \sin(\omega \cdot t)$$

with $V_{chauff}$ is the signal present on the input 144, t is the time,

ω is a prescribed angular frequency.

The current flowing through the measurement resistor R is then:

$$I(t) = I_{pol} + (V_{chauff}/R) \cdot \sin(\omega \cdot t)$$

The average value of i(t) is equal to $I_{pol}$.

The power p(t) in the measurement resistance R is then:

$$P(t) = R \cdot \{I_{pol}^2 + 2 \cdot I_{pol}(V_{chauff}/R) \cdot \sin(\omega \cdot t) + (V_{chauff}/R) \cdot \sin(\omega \cdot t))^2\}$$

and has an average value of $$\overline{p}(t) = R \cdot I_{pol}^2 + \frac{1}{2} \frac{V_{chauff}^2}{R}$$

The measurement resistance R is equal to $$R = R_{mes0}[1 + \gamma(T - T_0)] \text{ with}$$

-continued $$\gamma = \frac{\alpha}{1-\alpha(T-T_0)} \text{ and } \alpha \equiv \frac{1}{R}\frac{dR}{dT}$$

$$S = \frac{V_s}{P_{INC}} = \frac{\alpha \eta I_{pol} R}{(G_{th}^2 + \Omega^2 C_{th}^2)^{1/2}}$$

S: sensitivity,
$V_s$: output voltage of the bolometer between the terminals 4, 5 of the measurement resistor R,
$P_{INC}$: radiated power to be measured,
α: temperature coefficient of resistance (TCR),
η: absorption factor of the absorbing layer 2,
$I_{pol}$: bias current,
R: measurement resistance of the bolometer,
$G_{th}$: thermal conductivity between the measurement resistor of the bolometer and its surroundings towards the thermostat 101 at T0,
Ω: angular frequency of the incident radiated signal,
$C_{th}$: heat capacity.

It is therefore possible to have the power dissipated in the measurement resistor change, and therefore its temperature, without changing its operation point, given that the average current flowing through the measurement resistor remains constant with value $I_{pol}$.

FIG. 3 shows, as a function of time t in seconds in abscissa, different voltage measurements in volts, conducted on a bolometer on a glass membrane and metal resistor R. The square wave signal $P_{INC}$ corresponds to the application of incident power. To this thermal stimulation, the closed loop system responds with a return signal $V_{chauff}$, which is applied to the measurement resistor by capacitive coupling via the signal V1 corresponding to a high frequency carrier amplitude-modulated by the envelope signal $V_{chauff}$.

The invention thus allows heat feedback control while exhibiting simplification of the manufacturing method, higher integrability and improvement in the performances of the feedback control, notably including reduction of the time constant, increase in sensitivity, because of the ultimate proximity between the measurement and heating resistances, which coincide and finally better immunity to TCR (temperature coefficient of the resistance) variations related to ageing.

Figure 4:
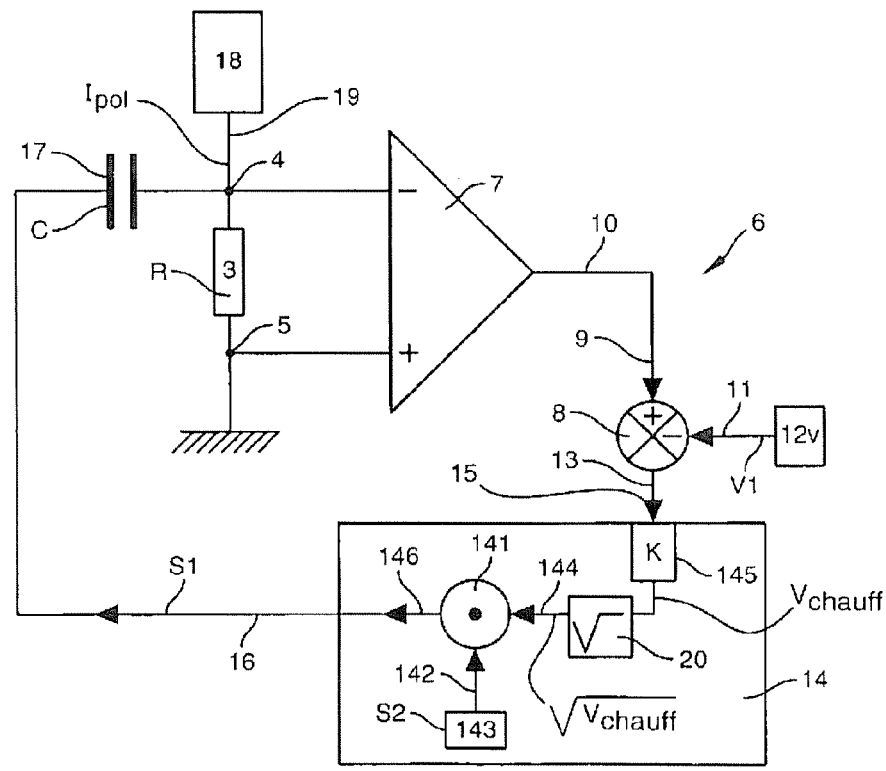
FIG. 4 is an electric diagram of the principle of the bolometer according to the invention, in a second embodiment.

In a second embodiment according to the first embodiment of FIGS. 1-3, there is additionally a means 20 with which the power of the signal S1 may be linearized depending on the difference signal $V_{chauff}$ or on the temperature signal measured by the element 2. In FIG. 4, this linearization means 20 for example assumes the form of a module for forming the square root positioned upstream from the amplitude-modulation multiplier 141 and downstream from the input 15, for example between the module 145 and the multiplier 141 (or alternatively between the module 145 and the input 15). The module 20 thus forms on the input 144 a signal proportional to $\sqrt{V_{chauff}}$. The power P(S1) of the signal applied by the means 17 to the element 2 is then proportional to the difference signal $V_{chauff}$.

Figure 5:
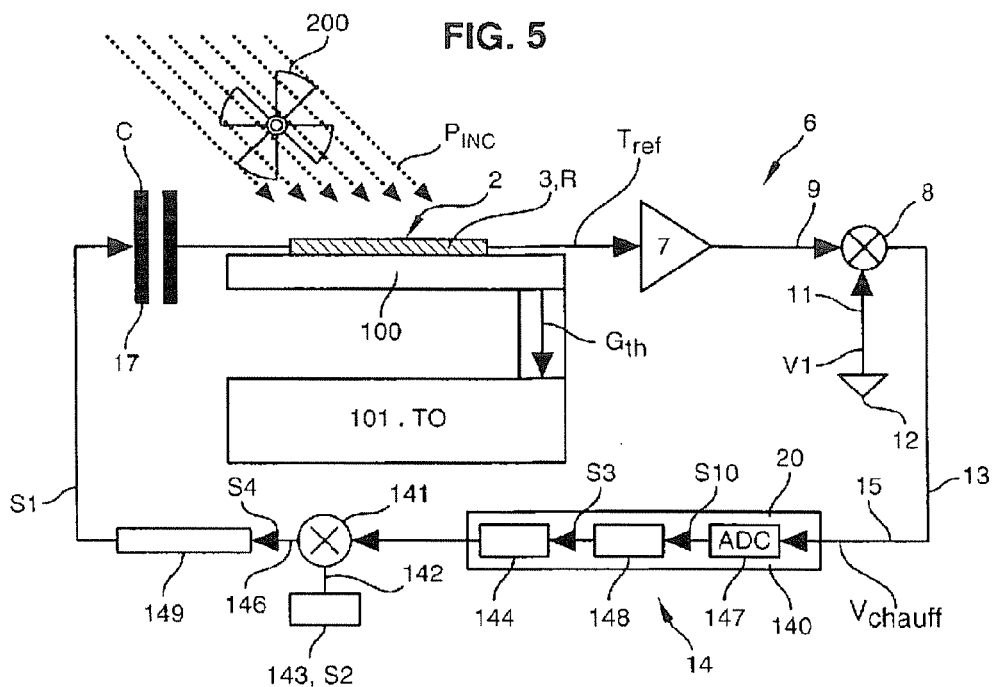
FIG. 5 is an electric diagram of the principle of the bolometer according to the invention, in a third embodiment.

In the third embodiment illustrated in FIG. 5, the means 20 for linearizing the power of the signal S1 as a function of the difference signal $V_{chauff}$ assumes another form. The difference signal $V_{chauff}$ is digitized in the digital corrector 14. The difference signal may also be formed in the controller by digitization of the signal 9 and calculation of the difference with a value stored in memory in the controller. This corrector 14 is applied by a microcontroller 140, a microprocessor, a microcomputer or other means. For this purpose, the difference signal $V_{chauff}$ is sent into the corrector 14 to an analog/digital converter 147 providing a digital signal S10 from the analog difference signal $V_{chauff}$ present on the input 15 of the corrector 14. This digital signal S10 is pulse-width modulated (PWM) by a pulse-width modulation module 148, for example including a proportional and integral controller PI for applying a proportional and integral correction to the signal S10, in order to form a third intermediate signal S3, a so-called heat feedback signal. The duty cycle β of the third pulse-width modulated intermediate signal S3 is equal, expressed in %, to β=100.$t_{ON}$/T wherein
$t_{ON}$ is the time during which the signal S3 is found at a first level, for example the high level 1,
T is the prescribed and constant period of the signal S3,
$t_{OFF}$=T−$t_{ON}$ is the time during which the signal S3 is found at a second level different from the first level, this level for example being the low level. The average value of the pulse-width modulated intermediate signal S3 is equal to the signal value at the output of the controller.

The corrector 14 provides on its output 144 the third intermediate signal S3. The output 144 is connected to the multiplier 141 in order to perform amplitude modulation of the third intermediate signal S3 with the second sinusoidal carrier signal S2 of the module 143, so as to provide on the output 146 a fourth sinusoidal signal S4 for only one of the first and second levels of S3, for example for the first level corresponding to $t_{ON}$ and a constant signal, for example zero for the other level of S3, for example for the second level corresponding to $t_{OFF}$.

The fourth signal S4 is then sent by means of the coupling means 17 in order to form the frequency signal S1 for example via a band pass filter 149 around the frequency of the carrier S2.

The digital value calculated by the proportional and integral controller as a function of the signal S10 is equal to the average value of the signal S3, i.e. equal to β. Vmax,
with Vmax being the maximum voltage at the output of the digital component for a duty cycle β of 100%.

$$S2 = K_{ampl}\sin(\omega.t)$$

$$S4 = K_{mult}.S3.S2 = K_{mult}.K_{amp}.\sin(\omega.t).S3$$

With $K_{ampl}$ being a constant and $K_{mult}$ being a constant linked to the multiplier.

The RMS value of the signal S4 is $$V_{RMS}(S4) = \sqrt{\frac{1}{T}\int_0^T (K_{mult} \cdot S3 \cdot S2)^2 dt}$$

i.e.

$$V_{RMS}(S4) = \sqrt{\frac{1}{T}\int_0^{\beta T}(K_{mult}^2 \cdot V_{max}^2 \cdot S2)^2 dt}$$

$$V_{RMS}(S4) = \sqrt{\frac{\beta}{2}K_{mult}^2 \cdot V_{max}^2 \cdot K_{ampl}^2}$$

$$V_{RMS}(S4) \propto \sqrt{\beta}$$

$$P(S1) = \frac{V_{RMS}^2(S4)}{R_{mes}} \propto \beta \propto S3 \propto V_{chauff}$$

wherein P(S1) is the power of the signal S1 and the symbol ∝ means proportionality.

The feedback power applied on the measurement resistor is therefore directly proportional to the value calculated at the output of the controller 158. The system is then entirely linear. There is no need to make an assumption for the linearization and the calculation of the correctors.

With pulse-width modulation, it is thereby possible to linearize the power of the signal S1 as a function of the difference signal $V_{chauff}$. The system is also of a greater simplicity of use. The open loop-closed loop transition may be better controlled. The setting up of the controller and therefore of the closed loop performances is simpler. Linearization may of course be applied as in analog linearization by using a digital square root function, but the use of pulse-width modulation (PWM) directly allows linearization without any complementary function or other calculation.

Of course, in the embodiments described above, the amplitude modulation may be carried out with a multiplier 141 or a simple switch, for example with transistor(s).

Figure 6:
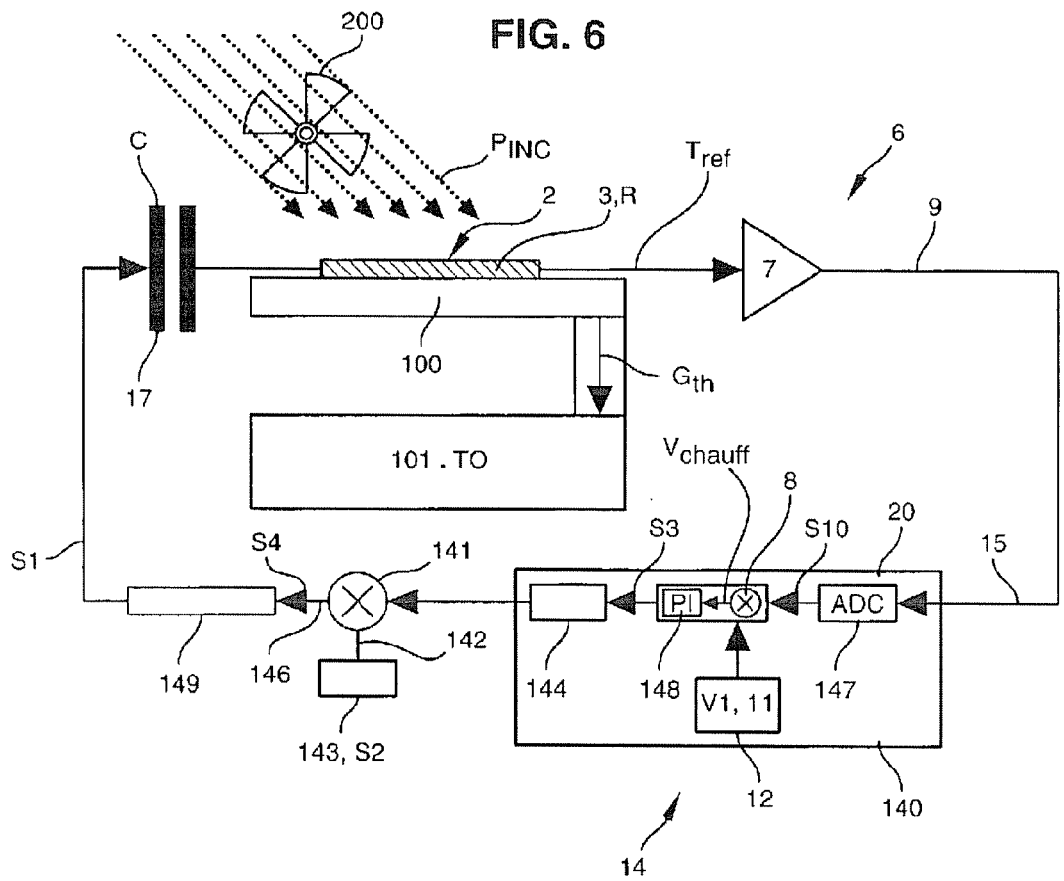
FIG. 6 is an electric diagram of the principle of the bolometer according to the invention, in an alternative of the third embodiment.

FIG. 6 is an alternative to FIG. 5, where the difference signal $V_{chauff}$ is digital and is formed after converting the analog temperature signal present on the output 9 into a digital signal in the analog/digital converter 147, the output 9 being directly connected to the input 15. The elements 8, 11 and 15 are digital in order to form the digital difference $V_{chauff}$ between the digitized output 9 at the output S10 of the converter 147 and the constant digital signal V1 provided by a digital module 12. The digital difference signal $V_{chauff}$ is sent to the module 148. The constant digital value V1 is a setpoint value prerecorded in a memory 12 of the microcontroller or of other means.

The invention may be implemented in all the applications of the heat substitution technique. The main contemplated field of application is that of bolometry at room temperature. The invention may be applied to infrared cameras, matrices of pixels and to all infrared imaging viewing devices, notably in the far infrared (frequency of the order of one Terahertz). A typical application of this field is infrared thermography for night vision or enhanced vision devices. The invention finds applications in the military field and in the civilian field. A civilian application within the scope of regulations on road safety, is driving assistance, wherein infrared thermography is one of the concepts being developed for improving safety, for assisting with night vision and the localization of living hot bodies for preventing impacts.

What is claimed is:

1. A bolometer comprising, an outer absorption surface for heat absorption of incident radiation, the outer absorption surface being in a thermal contact with at least one measurement element operably measuring the incident radiation, having an electric measurement resistor, variable as a function of temperature, the measurement element being located in a heat feedback control loop including a corrector operably applying heating power to a resistive heater for maintaining the temperature of the electric measurement resistor equal to a setpoint temperature, the resistive heater comprising the measurement element, the corrector operably generating a frequency component of the heating power, which is applied to a first coupling located between the measurement element and the corrector in order to apply to the measurement element a signal without any DC component, a second coupling, distinct from the first coupling, being located between the measurement element and a continuous biasing member for maintaining the electric measurement resistor at a prescribed continuous operation point.

2. The bolometer according to claim 1, wherein the first coupling is capacitive.

3. The bolometer according to claim 1, wherein the heat feedback control loop and the continuous biasing member are provided in order to change the power dissipated in the measurement resistor without changing its operation point.

4. The bolometer according to claim 1, wherein the first coupling applies a signal in a frequency band above 20 kHz to the measurement element.

5. The bolometer according to claim 1, wherein the heat feedback control loop includes means for forming an error signal between the signal present in the measurement element and a corresponding signal with a prescribed constant setpoint value, the corrector being provided for applying to the measurement element via the first coupling an alternating signal depending on the error signal.

6. The bolometer according to claim 5, wherein the corrector is provided for applying to the measurement element via the first coupling an alternating signal amplitude-modulated by the error signal.

7. The bolometer according to claim 5, wherein the corrector is provided for applying to the measurement element via the first coupling a first sinusoidal signal amplitude-modulated by the error signal.

8. The bolometer according to claim 5, wherein the corrector includes means for linearizing the frequency component of the heating power as a function of the error signal.

9. The bolometer according to claim 8, the linearization means of the corrector include means for pulse-width modulation of the error signal in order to form an intermediate signal and means for modulating the intermediate signal with a second sinusoidal signal in order to form a first sinusoidal signal applied to the measurement element via at least the first coupling.

10. The bolometer according to claim 9 wherein the corrector includes an analog/digital converter operably converting the error signal into a digital signal, the means for pulse-width modulation of the error signal include a proportional and integral type corrector for the digital signal in order to form the intermediate signal.

11. The bolometer according to claim 8, wherein the linearization means of the corrector include means for forming the square root of the error signal or a signal proportional to the error signal in order to form an intermediate signal and a modulator operably modulating the intermediate signal with a sinusoidal signal in order to form the alternating signal.

12. The bolometer according to claim 5, wherein the means for forming the error signal are digital.

13. The bolometer according to claim 1, wherein the measurement resistor includes manganite.

* * * * *